Aug. 31, 1943.   W. N. WOODRUFF ET AL   2,328,043
PARKING METER
Original Filed June 19, 1936    4 Sheets-Sheet 1

Inventors
Charles A. Toce
William N. Woodruff.

By J. Vincent Martin
and
Ralph R. Browning.
Attorneys

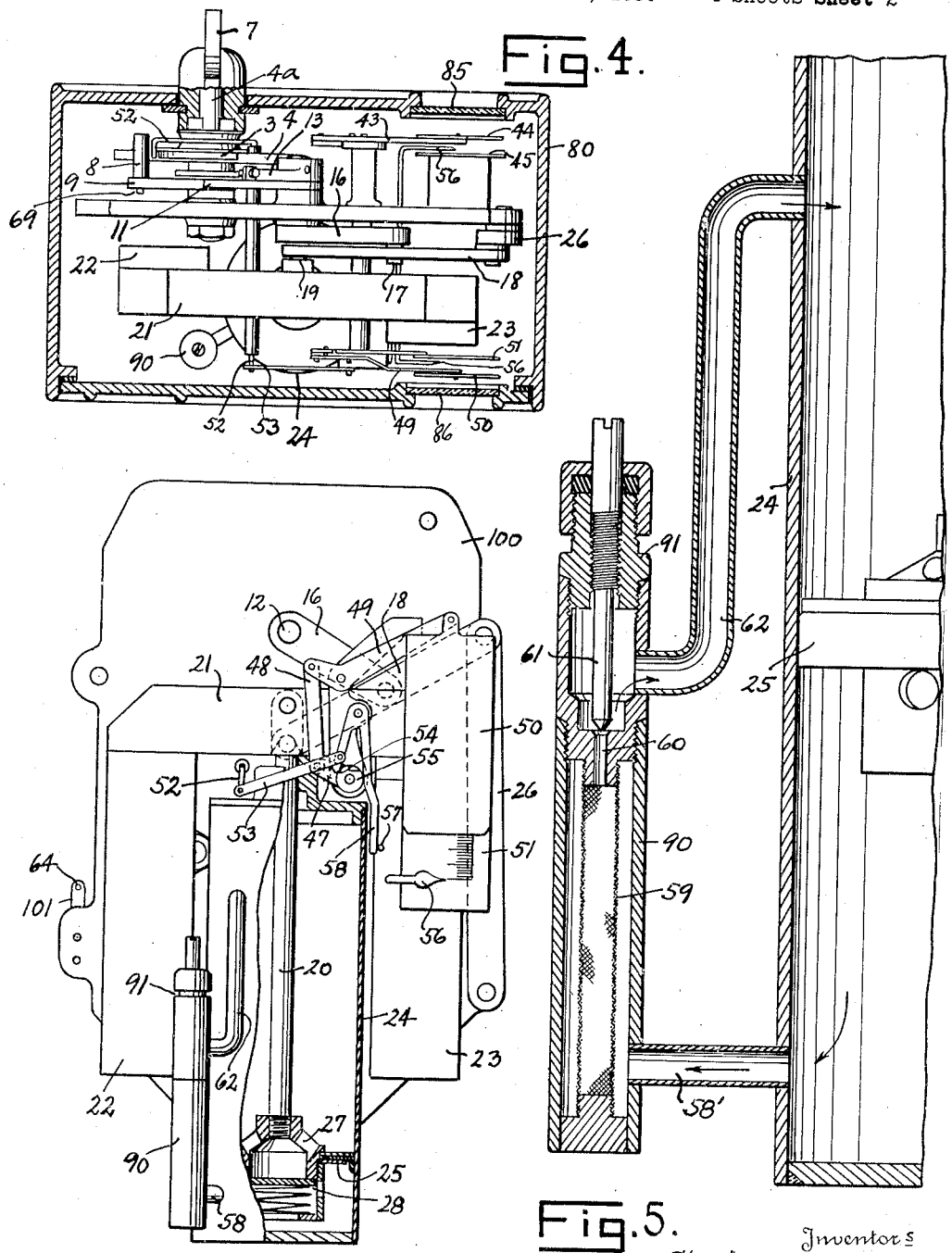

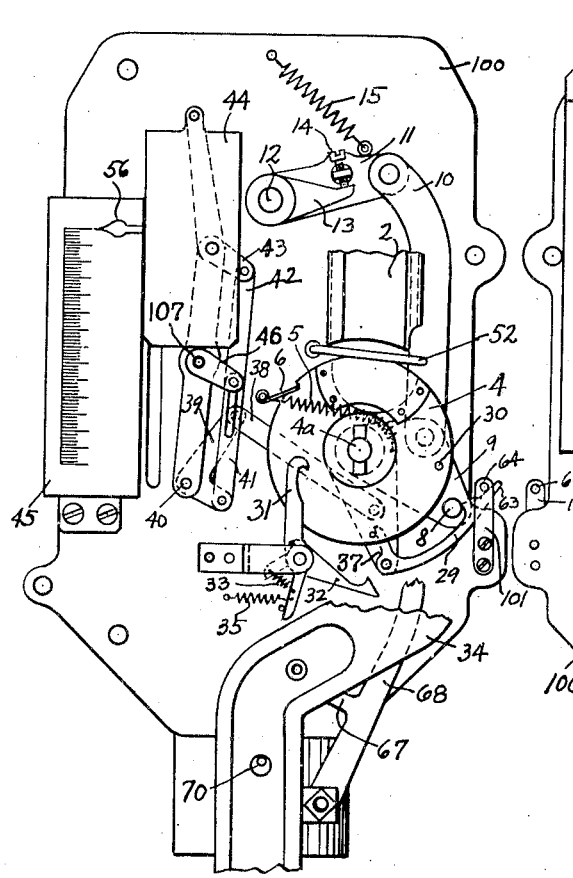
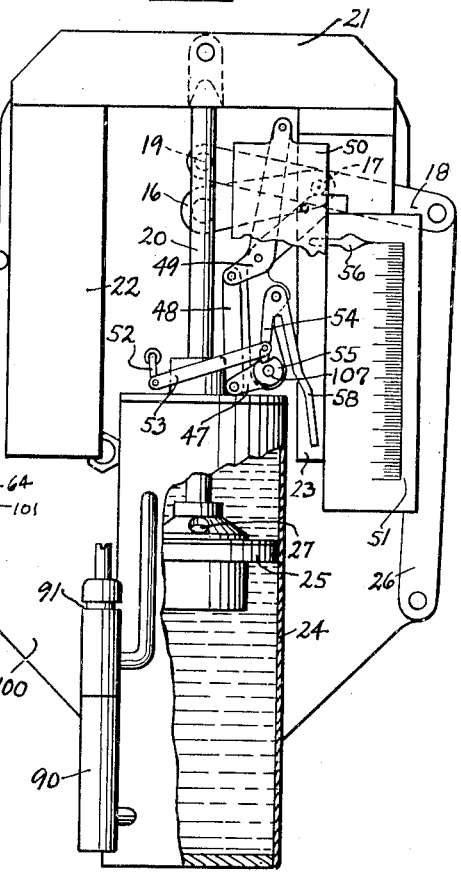
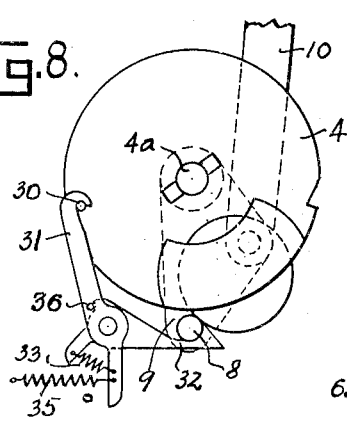
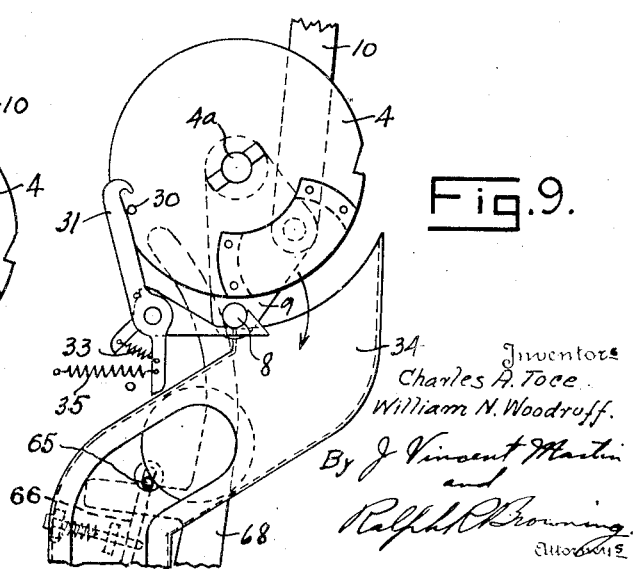

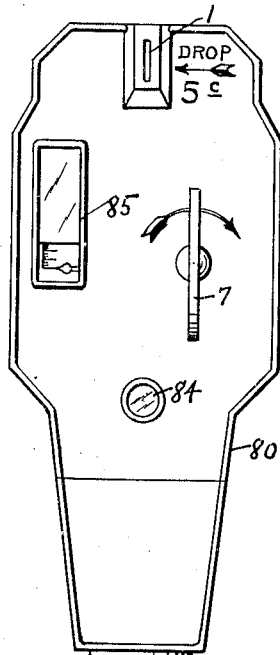
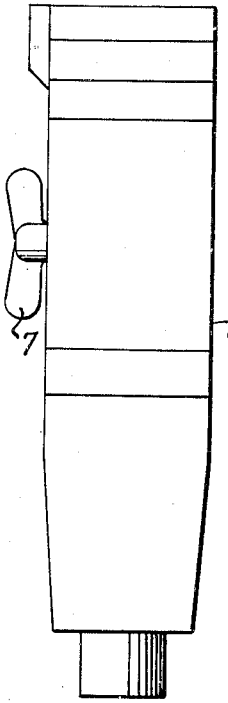
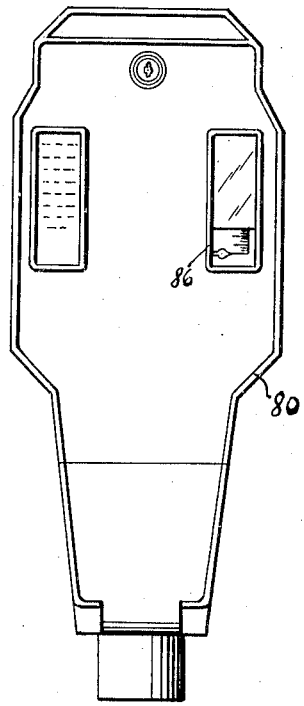
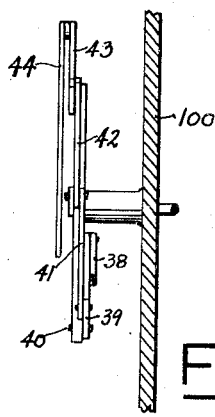
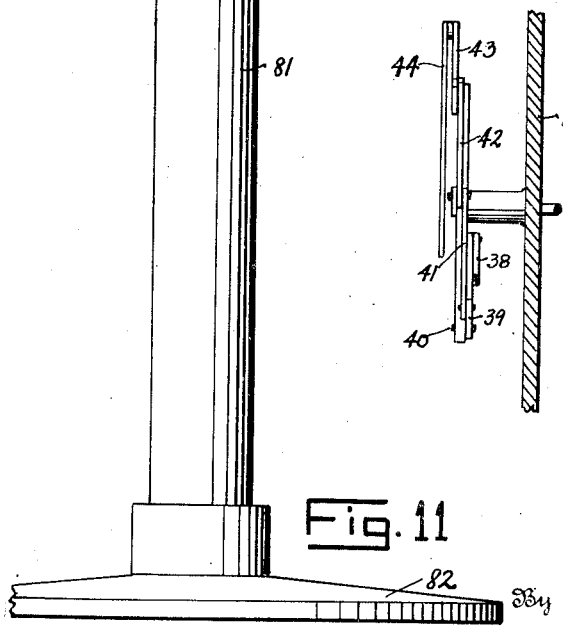

Patented Aug. 31, 1943

2,328,043

UNITED STATES PATENT OFFICE 2,328,043

PARKING METER

William N. Woodruff and Charles A. Toce, Houston, Tex., assignors, by mesne assignments, to Vehicular Parking, Ltd., Washington, D. C., a corporation of Delaware Application June 19, 1936, Serial No. 86,045
Renewed August 2, 1939

8 Claims. (Cl. 161—15)

This invention relates to check-controlled parking meters; that is, meters used to indicate a period of time occupied, for example, by a vehicle parked in a space controlled by the meter. However, the invention is capable of other uses, and no limitation in this respect is implied. When used for parking spaces, the meter will be set or started by a coin mechanism, and will be provided with a scale related to time, with an indicator controlled by the operating mechanism of the meter to show the period of time taken or elapsed.

The operating mechanism includes an upright cylinder in which is a valved piston which is weighted to descend by gravity during a period regulated by an adjustable and restricted by-pass from the bottom of the cylinder to the top, whereby the fluid in the cylinder has a retarded transfer from below to above the piston and so controls the time required for the piston to drop.

The coin controlled mechanism includes a turning part or handle which on the deposit of a proper coin makes a connection which lifts the piston and also the index or pointer, and is then released and turns back to resetting position.

The apparatus also includes a shutter which conceals the scale when the device is not working, and various other improved constructions and devices will be apparent from the following specification.

One form of the invention is illustrated in the accompanying drawings in which:

Fig. 3 is a rear elevation partly in section showing particularly the cylinder, and piston construction.

Fig. 4 is a horizontal section through the housing on the line 4—4 of Fig. 1 showing a plan view of the mechanism.

Fig. 5 is a detail in section of the cylinder and the by-pass.

Fig. 6 is a detail in front elevation of the coin mechanism, partly broken away.

Fig. 7 is a rear elevation partly in section.

Figs. 8 and 9 are enlarged details in elevation of the coin operating devices.

Fig. 10 is a detail in section of some of the parts.

Figs. 11 is a front elevation of the meter and its stand.

Fig. 12 is a side elevation thereof.

Fig. 13 is a rear elevation thereof.

Figure 1:
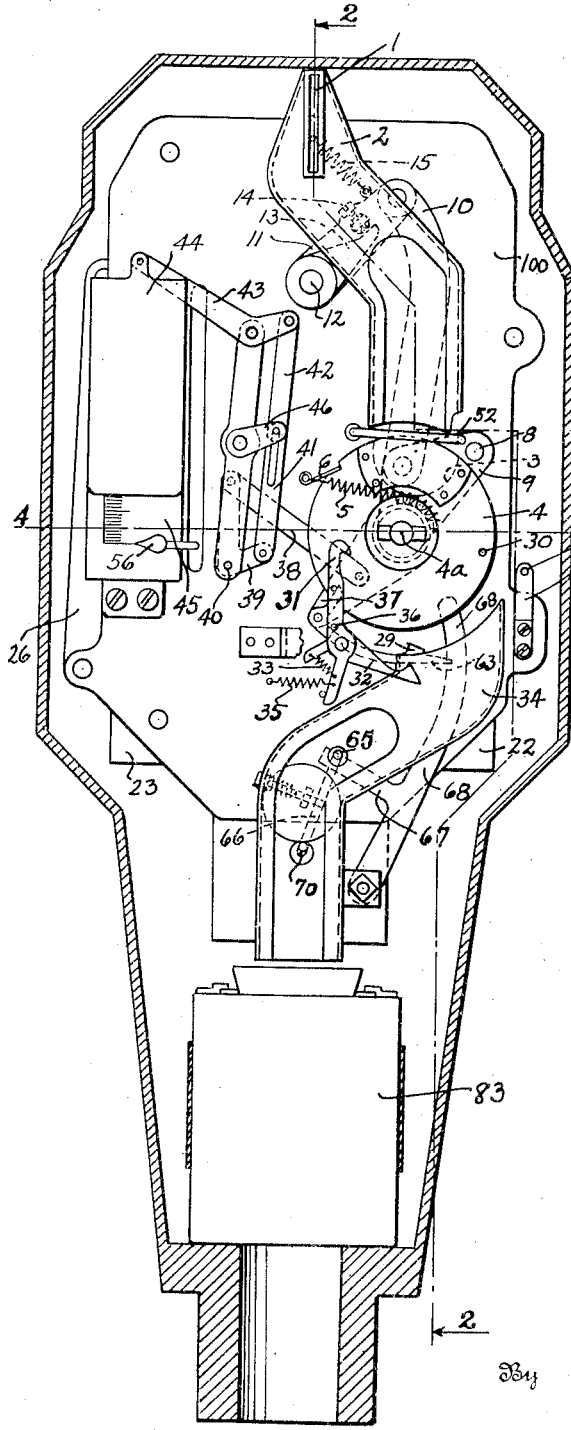
Fig. 1 is a front elevation of the mechanism with the front of the casing removed.

Referring particularly to the drawings 80 indicates a casing of proper size and shape to house the parts hereinafter described. This may be stood on a post 81 and base 82. The lower part of the casing contains the coin box 83. The casing has a front sight opening 84, a coin slot 1, and a window 85 to expose the front scale. The rear of the casing has a window 86 to expose the rear scale; and such ornamentation may be provided as suits the nature of the machine.

The coin slot 1 leads to a chute 2 through which a coin when deposited will drop into a recess 3 in the edge of a turning part or disk 4. This disk is normally held in the starting position shown in Fig. 1 by a spring 5 connected to the hub of the disk, a pawl 6 engaging a notch in the disk to prevent excessive back movement. With a coin in the recess 3 the knob or handle 7 on the shaft 4a of the disk is turned to turn the disk, carrying with it the coin which engages a pin 8 on a lever 9 so as to connect the disk to the lever and cause the latter to turn with the disk. This lever is connected to the lower end of a link 10 the upper end of which is connected to a lever 11 mounted on a rock shaft 12. Keyed to the shaft 12 is a lever 13 adapted to be turned by the movement of the lever 11, being engaged therewith by a set screw 14. The spring 15 normally holds the lever 11 and the parts connected thereto in uppermost position. On its rear end the rock shaft 12 carries a lever 16 pivotally connected at 17 to a middle point on a floating lever 18. One end 19 of the floating lever 18 is pivoted to a piston rod 20 having at its upper end a cross bar 21, and from the ends of this cross bar are suspended weights 22 and 23. At the lower end of the piston rod 20, within a cylinder 24, is the piston 25 which serves to retard the downward movement of the weights incident to gravity. The opposite end of the lever 18 is connected to a pivoted link 26, the purpose of the linkage 16, 18 and 26 being to permit a straight line movement of the rod 20.

The piston 25 is shown in detail in Fig. 3, and it has openings 27 controlled by a spring pressed valve 28 which opens downwardly when the piston is lifted and permits the quick passage of fluid in the cylinder from the upper to the lower side of the piston.

As the disk 4 is further turned, the pin 8 on the lever 9 will pass a hook 29, and a pin 30, on the side of the disk, will ride up against a hook 31 causing a hook 32 to engage the pin 8. Hook 32 is connected to the hook 31 by means of a spring 33. If, now, the handle 7 is released, the hook 32 will hold the pin 8 and detain the arm 9 until the coin moves away from the pin 8 and drops into a chute 34 leading to the coin box 83. Further movement of the disk releases the pin 30 from the hook 31 and permits the hook to be swung to the right by the spring 35 connected to the lower end thereof. The pin 36 on the hook 31 contacts the hook 32 and disengages it from the pin 8. Lever 9 then swings back to the left under the influence of the spring 15 and carries with it the hook 29 and the lever 37. The tail 63 of the hook 29 stops against a pin 64 supported by a bracket 101. This lever 37 pulls the link 38 causing a bell-crank 39 to rotate to the right, pulling downwardly on the link 41 and the link 42 and a bell-crank 43 to raise a shield 44 against the action of gravity from in front of a scale 45, which as stated is exposed through the front window 85. Simultaneously, a lever 47 on the shaft 107 of the lever 46 is swung to the left as shown in Fig. 7, pulling down the link 48 and moving a bell-crank 49 to lift a shield 50 from before the rear scale 51, which as stated is exposed through the window 86 in the casing.

When the coin is first inserted and the disk 4 is turned the coin raises the end of a crank 52 and moves a link 53 to shift a pawl 54 to a position to release it from a notch in a member 55 on the lever 47. If the shield 50 should happen to be up at the time the disk is turned, this will release the shield and allow it to drop, thus covering the scale 51.

Pointers or indexes 56 are attached to the weight 23 and move downwardly over the scales 45 and 51, respectively, as the weights descend. A pin 57, on the weight 23, is adapted to wipe against the bent arm 58 of the pawl 54 and move it to release the shields and allow them to drop at the expiration of the selected time.

Figure 2:
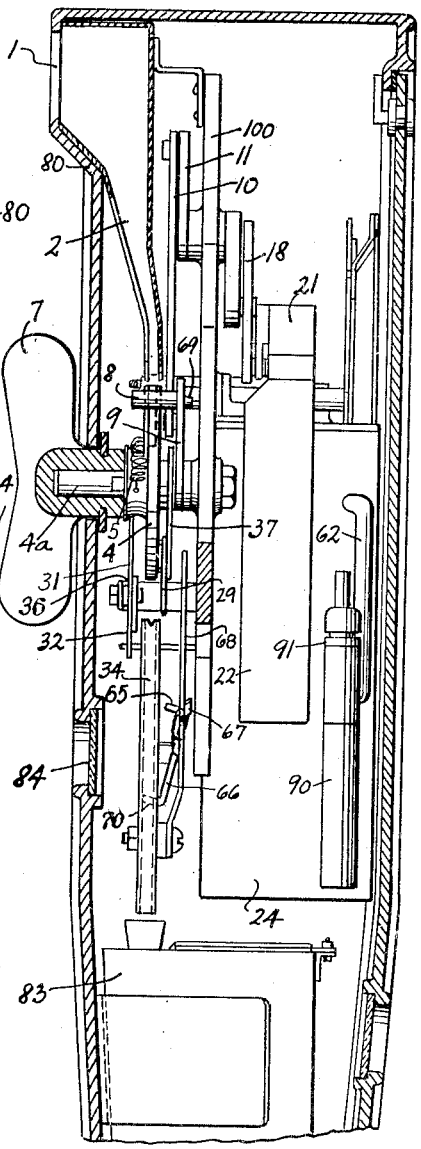
Fig. 2 is a vertical section on the line 2—2 of Fig. 1.

When the coin drops into the chute 34, it stops against the end 65 of a rocker arm 66. This rocker arm is controlled by a cam lever 67 having an upper part 68 adapted to be contacted and operated by the rear projecting end of the pin 8 on the lever 9. Upon reverse movement of the lever 9, the cam lever will, therefore, shift the rocker arm to the position shown in Fig. 2 and the coin will drop and rest against the lower finger 70 of this arm. In this position it will be held so that it may be viewed through the small window 84 in the housing 80. On the next operation, the coin will be dropped into the coin box 83 and the next coin will take its place.

The descent or downward movement of the piston 25 and hence of the weights is retarded and controlled by the passage of fluid through a by-pass shown particularly in Fig. 5, comprising a pipe 58' opening from the cylinder below the piston, an upright tube 90 containing a screen 59, and a restricted opening 60 from which the fluid passes through a connection 62 to a point in the cylinder above the piston. The size of the opening 60 is controlled by an adjustable valve 61 tapped through a plug 91 in the top of the tube. The valve 61 is preferably made of brass or of some material having a high degree of expansion, while the surrounding casing is made of steel or the like, so that as the atmospheric temperature rises the valve will be closed to some extent to compensate for the change in viscosity of the fluid used.

It will be seen, therefore, that when the device is set and started by the deposit of a coin and the turning of handle 7 to the right the weights and the piston will be lifted, the fluid in the cylinder passing freely from above the piston to the underside thereof, through the valve 28. Then, the weights and piston will descend by a retarded movement depending on the control of the valve 61 in the by-pass and at the same time the pointers 56 will travel down the scales 45 and 51 indicating the elapsed time and finally the scales will be covered by the shields 44 and 50 to indicate the completion of the period.

The various moving parts of the mechanism are mounted on an intermediate plate 100 supported in any suitable manner, as by brackets 101 within the housing.

Various modifications may be made within the scope of the invention, particularly with respect to the coin controlled devices used to set and start the meter.

We claim:

1. In a timing meter, the combination of a scale, an index movable along the same, a motor and timing mechanism including a weighted piston and associated cylinder operatively connected to the index to move the same along the scale in accordance with the passage of time, manually operated means to lift the weighted piston and release the same and permit it to lower due to the weight, said means including a turning part and a lever connection between said turning part and the piston, to lift the latter, a shield movable to cover the scale and index, and operating connections between said turning part and shield, constructed to remove the shield when the piston is lifted and restore the same when the piston has reached a desired lower position upon expiration of a predetermined period of time following the lifting of said piston.

2. In a timing meter, the combination of a scale, an index movable along the same, a motor and timing mechanism including a weighted piston and associated cylinder operatively connected to the index to move the same along the scale in accordance with the passage of time, manually operated means to lift the weighted piston and release the same and permit it to lower due to the weight, said means including a turning part and a lever connection between said turning part and the piston, to lift the latter, a shield movable up and down in front of the scale and index, and operating connections between said turning part and shield, constructed to lift the shield when the piston is lifted and lower the same when the piston has reached a lower position, said operating connections including a latch which holds the shield in raised position when the piston is lifted, and means to automatically release the latch and permit the shield to drop when the piston has reached a desired lower position upon expiration of a predetermined period of time following the lifting of said piston.

3. In apparatus of the character described, a timing device comprising in combination, means for indicating the passage of time, means for actuating said means, including means supplying a force moving said indicating means and dashpot means retarding the motion thereof at a desired uniform rate, and means controlled by said actuating means for rendering invisible said time-indicating means upon the expiration of a predetermined period of time following the actuation of said time-indicating means.

4. In apparatus of the character described, a timing device comprising in combination, means for indicating the passage of time, means for actuating said means including means supplying a force moving said indicating means and dashpot means retarding motion thereof at timing rate, shield means controlled by said actuating means for covering said time-indicating means upon the expiration of a predetermined period of time following the actuation of said time-indicating means, and means for initiating operation of said actuating means and for setting said shield at a position exposing said indicating means.

5. In apparatus of the character described, a timing device comprising in combination, means for indicating the operative condition of said device, means for actuating said indicating means including dashpot means with thermostat control means for retarding actuation thereof at a desired rate throughout temperature variations, and means operated by said actuating means for indicating the inoperative condition of said device upon the expiration of a predetermined period of time following the actuation of said indicating means.

6. In a parking meter, in combination, timing mechanism including energy-storage means, time-indicating means associated with said timing mechanism comprising a dial and pointer, means for resetting said time-indicating means to initial operating position and restoring the energy of said timing mechanism, and signal means rendered operative upon initiating said resetting operation and rendered inoperative upon completion of the same.

7. In a parking meter, in combination, timing mechanism including energy-storage means, time-indicating means associated with said timing mechanism comprising a dial and pointer, means for resetting said time-indicating means to initial operating position and restoring the energy of said timing mechanism, manual means for actuating said resetting and restoring means, and signal means actuated only during the resetting of said time-indicating means for showing that said resetting operation is in progress and is not yet complete.

8. In a parking meter, in combination, timing mechanism including energy-storage means, time-indicating means associated with said timing mechanism comprising a dial and pointer, means for resetting said time-indicating means to initial operating position, manual means for actuating said resetting means and restoring the energy of said timing mechanism, token-actuated means for operatively connecting said manual means with said resetting and energy-restoring means, and signal means actuated during the resetting of said time-indicating means for showing that the meter is being reset and restored in energy for another cycle of operation.

WILLIAM N. WOODRUFF.
CHARLES A. TOCE.